Patented Dec. 10, 1940

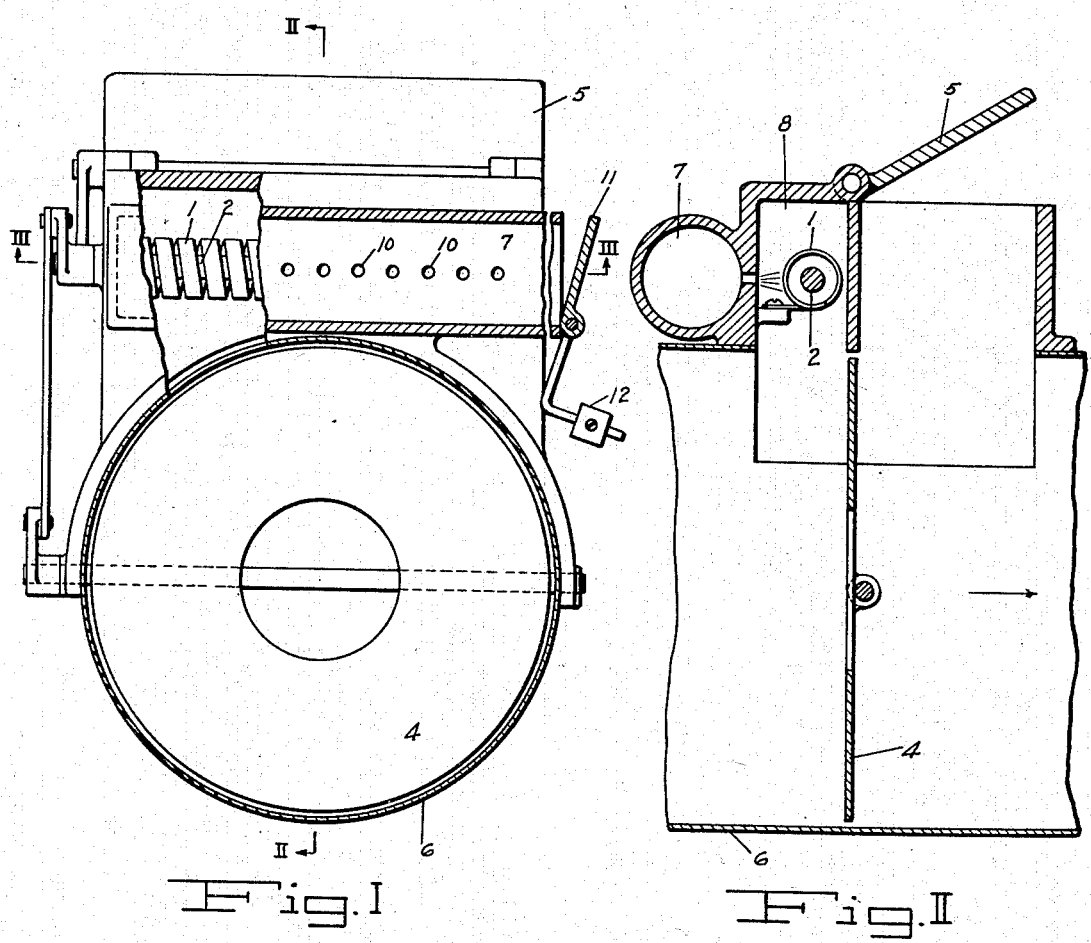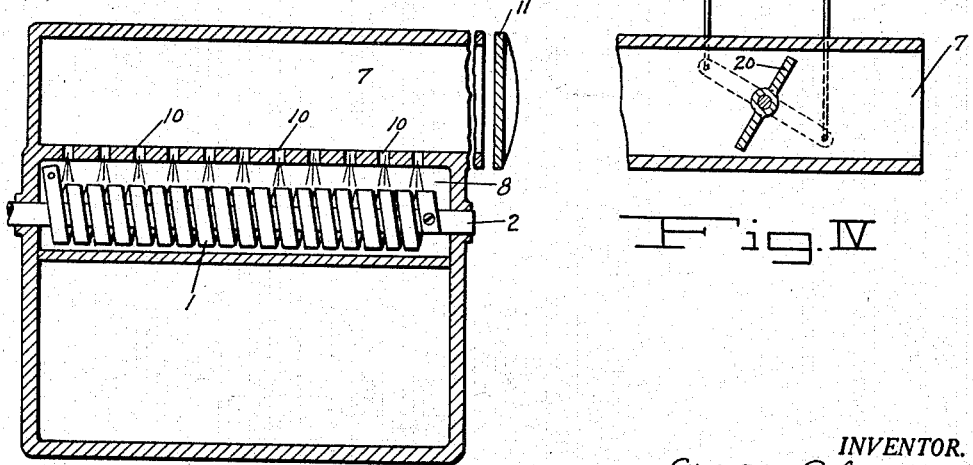

2,224,210

UNITED STATES PATENT OFFICE 2,224,210

GOVERNOR FOR THERMOSTATS

Clayton G. Anderson, Portland, Oreg.

Application December 6, 1938, Serial No. 244,216

1 Claim. (Cl. 236—96)

This invention relates to a governor for thermostatic controls that is responsive to meteorological conditions. It is especially desirable as an adjunct to automatic draft control and has been so described and illustrated in the following specification and drawing, but not as a limitation, since it has other important uses which will be at once apparent to those skilled in the art of temperature control.

An object of this invention is to control the actual temperature applied to a thermostat, according to meteorological conditions as distinguished from heat conditions derived from the heating apparatus such as a furnace.

Another object is provision for control of a thermostat by temperature conditions remote from the instrument, where as a matter of mechanical expediency the thermostat must be built into an instrument and otherwise sensitive to proximate temperature conditions.

Another object of the invention is a governor for a thermostatically controlled draft regulator for a furnace that is sensitive to natural draft conditions, causing the thermostat to operate draft controls promptly under conditions of strong natural draft, thus preventing the undue loss of heat and to work only at a higher furnace temperature, under conditions of slight natural draft that the operation of the furnace may be improved under such conditions.

The above and other objects that will be at once apparent constitute the purpose of the present invention, the scope of which is to be ascertained by the claim that follows this specification.

Drawing accompanies and forms a part of this specification in which the illustration is of a thermostatic draft control, according to my Patent No. 2,102,873, with the present invention combined with it. Obviously as stated this combination by no means compasses its usefulness.

In the drawing—

Fig. I is a partially sectioned view of a thermostatic draft control that operates both a damper and a checkdraft and showing one view of the governor as applied to this use;

Fig. II is a section on the line II—II of Fig. I;

Fig. III is a section on the line III—III, Fig. I; and

Fig. IV is a short section of the duct 7 showing a butterfly substituting for the damper 11 under certain conditions.

In the drawing, 1 is a bi-metal thermostat mounted on a rockshaft 2 that is adapted to operate the damper 4 and the check draft 5, as is more fully explained in detail in the patent above named. Quite obviously, without the governing apparatus now to be described, heat conditions in furnace gases passing through the flue 6 in the direction shown by the arrow in Fig. II will be in complete control.

In order to make the thermostat 1 responsive to a combination of furnace gas temperature and meteorological conditions, I place one terminus of the duct 7 conveniently adjacent the chamber 8 in which the thermostat is located and provide distribution passageways, such as the holes 10 in such aspect to the thermostat that cool air entering the duct 7 will be jetted against it, thus slowing its action.

To control the cool air entering the duct 7, I place a damper 11 that is biased to open position by the counterweight 12 or similar means, in position to control the air entering the duct 7. The duct 7 is shown very short and as shown the air entering it would be warmer than would always be the best practice, and it is contemplated placing the actual air inlet at some distance away from the smoke pipe and even outside of the building in some cases. If the duct 7 has its open end close to the floor of the furnace room, it will serve well under most conditions.

The thermostat governor may be utilized in an entirely different way by substitution of the butterfly 20 in an extension of the duct 7, which butterfly may be controlled automatically by a temperature sensitive device positioned remotely from the draft control; or as will be understood, a suitable manual control may be used and lead wires 21 and 22 diagrammatically indicate a remote control apparatus of the kind selected. By using the damper 11 and the butterfly 20 in series, still another mode and result is available.

The mode of operation of the governor is as follows in the first described assembly. When natural draft is light, a considerable amount of air will enter the duct 7, impinge on the thermostat 1, and delay its action to tend to assist the furnace to act well under light draft.

If on the other hand, meteorological conditions produce a strong natural draft, the resultant pressure on the damper 11 will shut it promptly, cutting off outside cool air altogether; hence the thermostat will be quickly affected by hot gases from the furnace to impair the draft to a minimum fixed by the construction of the draft control which must always leave some area for furnace gas to escape.

Intermediate atmosphere conditions will produce intermediate results.

By substituting the butterfly, we get an entirely new mode and result. Natural draft is ignored altogether and the thermostat 1, may in effect be adjusted from a remote point, either manually or automatically. Other modes and results from employing the thermostat governor will be at once perceived if it is associated with other instrumentalities.

Having fully disclosed my new governor and described its mode of operation under two kinds of hook-up, what I claim as new and desire to secure by Letters Patent, is—

Thermostatic draft control apparatus for a flue between a furnace and a stack comprising a flue, damper means in said flue, a thermostat operatively connected to said damper that is positioned to be in part controlled by flue temperature, an auxiliary air duct arranged to bring air from a point remote from the thermostat and impinge it thereagainst under influence of flue draft and air inlet control means for the inlet end of said duct comprising a damper that is biased to normal open position and tends to close as draft therethrough increases.

CLAYTON G. ANDERSON.